United States Patent [19]

Stolov et al.

[11] Patent Number: 4,560,241

[45] Date of Patent: Dec. 24, 1985

[54] LIQUID CRYSTAL DEVICE FOR MULTICOLOR IMAGES COMPRISING THIN PROTECTIVE GLASS PLATE

[76] Inventors: Michael Stolov; Adi Stolov, both of 25 Hapoel St., Nof Yam, Israel

[21] Appl. No.: 552,378

[22] Filed: Nov. 16, 1983

[30] Foreign Application Priority Data

Nov. 2, 1983 [IL] Israel .................................. 70116

[51] Int. Cl.⁴ .................... G02F 1/13; G02F 1/137
[52] U.S. Cl. ...................... 350/339 R; 350/339 F
[58] Field of Search ............ 350/339 R, 339 F, 347 E

[56] References Cited

U.S. PATENT DOCUMENTS

| 4,006,968 | 2/1977 | Ernstoff et al. | 350/339 F |
| 4,227,777 | 10/1980 | Murakami | 350/339 F X |

FOREIGN PATENT DOCUMENTS

| 0023421 | 2/1981 | European Pat. Off. | 350/339 F |
| 56-25714 | 3/1981 | Japan | 350/339 F |

OTHER PUBLICATIONS

Shimomura, T. & Kobayashi, S. "Color Shift Induced by Background Color in a Nematic Liquid Crystal Display," *Applied Optics*, vol. 19, No. 24, (Dec. 15, 1980), pp. 4206-4209.

*Primary Examiner*—John K. Corbin
*Assistant Examiner*—Richard Gallivan
*Attorney, Agent, or Firm*—Fleit, Jacobson, Cohn & Price

[57] ABSTRACT

There is provided a multicolor liquid crystal display comprising an integrated multilayer arrangement of the sequence: thick transparent plate, color filter, thin glass plate, liquid crystal, and thick glass plate, there being provided a transparent electrode pattern corresponding to that of the filter pattern, which electrode patterns are applied to the two surfaces which face the liquid crystal. The order of thickness of the thin glass plate is generally about 0.2 mm or less, and up to about 0.3 mm. The color filter may be in the form of a pattern of colored stripes or dots; there can also be used a multicolor filter comprising a pattern of stripes or dots of dichroic transmissive polarizing material, in conjunction with a polarizer applied to the rear plate of the device.

11 Claims, 6 Drawing Figures

LIQUID CRYSTAL DEVICE FOR MULTICOLOR IMAGES COMPRISING THIN PROTECTIVE GLASS PLATE

FIELD OF THE INVENTION

The invention relates to novel liquid crystal devices for the display of multicolor images. The device is based on an integrated multilayer structure comprising two outwardly facing transparent plates of conventional thickness, and between these a sequence of color filter, thin glass plate and liquid crystal layer with conventional electrodes.

BACKGROUND OF THE INVENTION

Multicolor liquid crystal displays are known and there exists a number of patents relating to same. Certain problems hinder the mass product of these and there exists also problems of quality of the displays and durability of the color filters used. A multicolor display is defined in U.S. Pat. No. 4,294,524 and another one in U.S. Pat. No. 4,410,887, which will be referred to in greater detail in the following, setting out the problems and drawbacks of the existing displays.

The present invention provides multicolor displays which eliminate to a large extent the drawbacks of conventional displays as regards paralax and stability.

SUMMARY OF THE INVENTION

According to the invention there are provided multicolor liquid crystal displays consisting of an integrated multilayer structure comprising a sequence of thick outer transparent plate, multicolor filter plate, thin glass plate with electrodes applied to same, liquid crystal layer, thick glass plate with electrodes applied to same facing the liquid crystal layer.

When the liquid crystal is of the twisted nematic type, there are advantageously provided two polarizers, attached to the outer surfaces of the thick transparent plates.

According to another embodiment of the invention, a reflective member is attached to one of the thick plates on its outer surface, resulting in a reflective or transflective device.

According to yet another embodiment of the invention, a twisted nematic type liquid crystal is used in combination with a dichroic transmissive polarizer comprising a plurality of stripes or dots of the varying required colors, such as red, green and blue, or other color combinations.

According to the invention, the filter is separated from the liquid crystal by a thin glass plate (of the order of 0.2 mm or even less thickness, and up to about 0.5 mm for large displays), preventing interaction of the dyes of the color filter and the liquid crystal material.

The filter and the liquid crystals are within the integrated sandwich structure, and thus protected from mechanical or other damage. The close proximity of the color filter and the liquid crystal with its transparent electrode pattern prevent any undesired effects such as paralax and the like.

DESCRIPTION OF THE PREFERRED EMBODIMENT

The invention is illustrated in the following with reference to existing multi-color displays which are part of the prior art, and with reference to a number of embodiments of the novel display means.

The following description is by way of illustration only and ought to be construed in a non-limitative manner.

DETAILED DESCRIPTION

It is stressed that the enclosed drawings are of a schematical nature and not according to scale as regards the thickness of the various component layers.

Displays according to the invention can be produced in various sizes. The thickness of the external plates is according to their size, and they are chosen so as to result in the required mechanical strength and rigidity of the integrated sandwich structures.

The one plate can be glass or a transparent plastic, as this is not in contact with the liquid crystal. The other plate which is in contact with the liquid crystal is a transparent glass plate. Typical thickness of such plates is of the order of from about 1 mm to about 3 mm.

The glass plate inside the structure is a very thin one, of the order of 0.2 mm or even less. The quality of the display is improved when as thin as possible internal glass plates are used. The liquid crystal layer is of conventional thickness, of the order of from about $8\mu$ to about $12\mu$.

Figure 1:
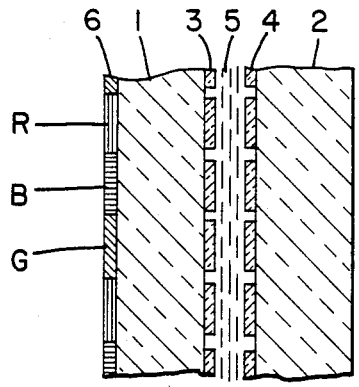
FIG. 1 is a partial section through a known display device.

FIG. 1 illustrates a conventional multicolor display according to U.S. Pat. No. 4,294,524 consisting of transparent plates 1 and 2, with transparent electrodes 3 and 4 applied to same, respectively with a liquid crystal layer between same, there being provided on one of the external surfaces of the thick plates, here on plate 1, a color filter 6, where, as in the following, R, B and G designate red, blue and green colors respectively.

This type of device gives satisfactory results when used as electronically controlled slide for middle or large-size segments of an image. When a matrix pattern is used, a parallax effect is possible when viewed from an oblique angle resulting from the thickness of the transparent plate 1. A further drawback is the provision of the filter at the external facet of the device, thus being likely to be scratched or damaged.

Figure 2:
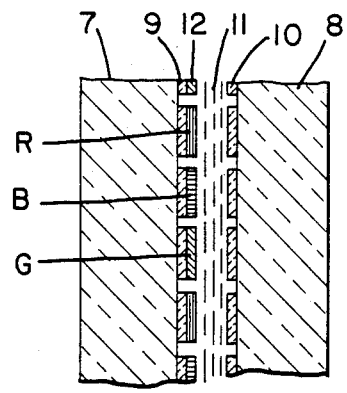
FIG. 2 is a partial sectional view of a known display device.

FIG. 2 illustrates another known device, according to U.S. Pat. No. 4,410,887 comprising a sequence of transparent plates 7 and 8, with liquid crystal layer 11 and electrode patterns 10 and 9 adjacent the liquid crystal, with multicolor filter 12 inside the device under or on transparent electrodes 9. The close proximity of the filter and the electrode pattern avoids any possible parallax. A drawback was found: the paints, dyes or inks used for the production of the filter are gradually attacked by the material of the liquid crystal and the provision of a protective layer is difficult and causes a drop of voltage, resulting in a loss of response time.

The drawbacks of the above multicolor display devices are obviated by the novel devices of the present invention.

A device according to the invention is illustrated with reference to FIG. 3, which comprises a sequence of transparent sheet-formed elements forming a sandwich arrangement according to the sequence of thick plate 13, multicolor filter 18, thin glass plate 15, liquid crystal layer 16 with electrodes 14 and 17 applied to the surfaces facing the liquid crystal layer 16, and thick plate 20. The plates 13 and 20 are of conventional thickness, say about 1 mm to 2 mm; while the plate 15 is very thin, about 0.2 mm or even less. For larger sizes a somewhat greater thickness may be required. The multicolor filter pattern is printed on the surface of the plate 13; it may also be printed instead on plate 15. The electrodes 14 and 17 are energized as required, resulting in a multicolored pattern and display, the filter pattern corresponding to that of the transparent electrodes. The various layers 13, 18 and 15 are cemented together resulting in a mechanically strong structure, providing support for the thin glass plate 15 and preventing any possible mechanical damage to this plate. Also the internally arranged color filter is protected against chemical damage by contact with the liquid crystal. When there is used a twisted nematic type liquid crystal, there are advantageously provided polarizers 19 and 21 applied to the external surfaces of the plates 13 and 20, respectively. When the liquid crystal is of the guest host black type, no polarizers are required.

A suitable reflective plate can be applied to either of the external surfaces of plate 13 or 20, resulting in a reflective or transflective device.

Figure 5:
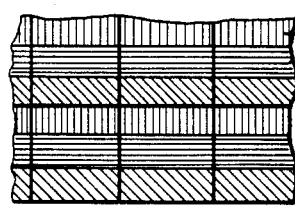
FIG. 5 is a front view of a multicolor polarizer comprising a plurality of colored stripes.
Figure 6:
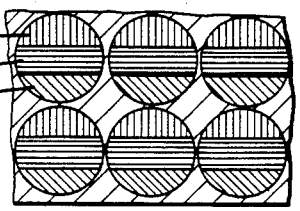
FIG. 6 is a front view of a multicolor polarizer comprising a plurality of colored circular dots.

When a twisted nematic type liquid crystal layer is used in a reflective display, there is advantageously used instead of the conventional color filter, a filter consisting of a pattern of stripes or dots of dichroic transmissive polarizers of different colors, for example red, green and blue, such patterns being illustrated in FIG. 5 and 6, said patterns corresponding with the electrode pattern of the device, resulting in a high degree of brightness of the display. The filter devices of FIG. 5 and 6 can be of any suitable pattern or color arrangement. Good results were obtained with the multicolor polarizer as front polarizer and with a reflective rear polarizer.

Figure 4:
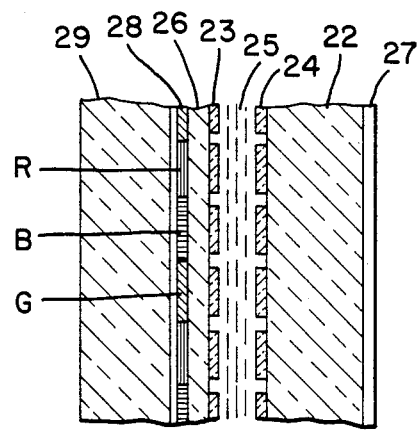
FIG. 4 is a partial sectional view through a device of the invention.

FIG. 4 illustrates a reflective/transflective twisted nematic type liquid crystal multicolor display containing a novel multicolor polarizer of the type defined above. The device comprises an integrated multilayer sandwich construction consisting of plate 29 made of glass or transparent plastic, of usual thickness, multicolor polarizer 28, thin glass plate 26 of the order of 0.2 mm thickness with transparent electrodes 23, attached to same facing the liquid crystal layer 25, the other side of which is faced by plate 22 to which there is applied the transparent electrode pattern 24, corresponding the pattern of the transparent electrodes 23, there being attached to the external surface of plate 22 a conventional reflective or transflective rear polarizer 27. This reflective multicolor liquid display switches at a much quicker rate than its guest-host counterpart, which is a considerable advantage for multiplexing. The device has a high degree of brightness.

It is clear that various types of liquid crystal materials can be used with the multi-layer arrangement of the present invention. Amongst these there may be mentioned substances using electrically controlled birefringence or dynamic deformation. Semiconductors can be used for addressing on the rear electrodes.

EXAMPLE 1

Figure 3:
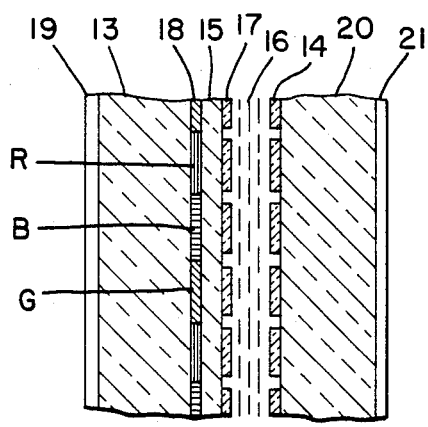
FIG. 3 is a partial sectional view through a device of the invention.

A device was constructed according to FIG. 3, in which 19 was a conventional transmissive polarizer, 13 a glass plate of 1.3 mm thickness, 18 a plurality of painted color filter stripes each 0.4 mm wide, of colors red, blue and green, 15 a transparent glass sheet 0.2 mm thick, 17 designates a plurality of transparent electrode stripes 0.3 mm wide with intervals of 0.1 mm, 16 designates a layer of twisted nematic liquid crystal of 10μ, 14 are transparent electrode stripes 0.3 mm wide, 20 a transparent glass plate 1.3 mm thick, and 21 a conventional polarizer. There was obtained a display of 8 electronically controlled colors: white, black, red, blue, green, cyan-yellow, and magenta. There was no parallax when viewed from any possible angle.

EXAMPLE 2

A device was constructed according to FIG. 4, consisting of a transparent glass plate 29, 1.3 mm thick, 28 is a multicolor filter consisting of stripes of 0.9 mm width of dichroic polarizers of the colors red, blue and green cemented to plate 29 with a transparent glue; 26 is a transparent glass sheet of 0.2 mm thickness, 23 designates transparent electrodes 0.8 mm wide, 25 is a twisted nematic liquid crystal of 10μ; 24 are transparent electrodes of 0.8 mm width; 22 is a transparent glass plate 1.3 mm thick, and 27 a conventional polarizer.

There was obtained a clear and bright image without any parallax with 8 electronically controlled colors: white, black, red, blue, green, yellow cyan and magenta.

We claim:

1. A multicolor liquid crystal display comprising an integrated multilayer arrangement, the sequence of layers being: a thick transparent glass or plastic plate, color filter pattern filter means, a thin glass plate, a liquid crystal layer, and a second thick plate of glass, said thin glass plate and said second thick glass plate each having a surface which faces the liquid crystal layer with each surface having applied thereto a transparent electrode pattern which corresponds to the color filter pattern and wherein said color filter pattern filter means is located between said thick transparent glass or plastic plate and said thin glass plate to protect the color filter pattern filter means from said liquid crystal.

2. A multicolor display according to claim 1, wherein the thin glass plate has a thickness of about 0.2 mm. or less.

3. A device according to claim 1, wherein the color filter pattern is a pattern of stripes or dots of desired colors.

4. A device according to claim 1, wherein the liquid crystal layer is of the twisted nematic type and said device further comprises two polarizers applied to respective external surfaces of said thick transparent plates of the device.

5. A device according to claim 1, wherein the liquid crystal is of the guest-host type made with black color.

6. A device according to claim 1, wherein the liquid crystal is of the electrically controlled birefringence type.

7. A device according to claim 1, wherein a reflecting plate is applied to an external surface of one of said thick plates.

8. A device according to claim 1, wherein a polarizer is applied to a rear surface of the device, and said color filter pattern comprises a pattern of stripes or dots of dichroic transmissive polarizing material of different colors.

9. A device according to claim 1, wherein said color filter pattern filter means is printed on a surface of said transparent thick glass or plastic plate facing said thin glass plate.

10. A device according to claim 1, wherein said color filter pattern filter means is printed on said thin glass plate.

11. A multicolor liquid crystal display comprising first and second spaced apart thick transparent plates and located therebetween a multilayered arrangement consisting essentially of in sequential order a color filter pattern filter means, a thin transparent glass plate, a first transparent electrode, a liquid crystal material, and a second transparent electrode, and wherein said transparent electrodes are respectively located on a surface of said first thin glass plate and said second thick transparent plate that encloses said liquid crystal material.

* * * * *